(12) United States Patent
Carlson et al.

(10) Patent No.: US 6,974,000 B2
(45) Date of Patent: Dec. 13, 2005

(54) SYSTEM AND METHOD FOR LIMITING VIBRATION IN AN APPARATUS DURING A LOSS OF POWER

(75) Inventors: J. David Carlson, Cary, NC (US); Michael J. Chrzan, Apex, NC (US); Lynn C. Yanyo, Cary, NC (US); Thomas Peuker, Bavaria (DE)

(73) Assignee: Lord Corporation, Cary, NC (US)

( * ) Notice: Subject to any disclaimer, the term of this patent is extended or adjusted under 35 U.S.C. 154(b) by 162 days.

(21) Appl. No.: 10/079,388

(22) Filed: Feb. 20, 2002

(65) Prior Publication Data

US 2003/0155195 A1 Aug. 21, 2003

(51) Int. Cl.$^7$ .................................... F16F 9/53
(52) U.S. Cl. ............. 188/267.2; 68/23.1; 188/74; 188/171; 188/31
(58) Field of Search ................ 188/267–267.2, 188/266.8, 378–380, 381, 382, 171, 173, 31, 60, 69, 67, 74; 267/136, 140.15; 248/550, 636; 701/37, 38; 68/12.06, 12.14, 23.6, 23.1, 23.3, 23.7; 280/5.501, 5.5, 124.16, 124.157

(56) References Cited

U.S. PATENT DOCUMENTS

| | | | |
|---|---|---|---|
| 2,960,190 A | * 11/1960 | Holper | 188/74 |
| 4,232,768 A | * 11/1980 | Dufresne | 477/25 |
| 4,437,325 A | 3/1984 | Hershberger | |
| 4,528,851 A | 7/1985 | Ozols | |
| 4,611,295 A | 9/1986 | Fowler | |
| 4,896,754 A | 1/1990 | Carlson et al. | |
| 5,019,119 A | 5/1991 | Hare, Sr. | |
| 5,140,493 A | 8/1992 | Janicek | |
| 5,207,081 A | * 5/1993 | Fuse | 68/23.1 |
| 5,277,281 A | 1/1994 | Carlson et al. | |
| 5,301,523 A | 4/1994 | Payne et al. | |

(Continued)

FOREIGN PATENT DOCUMENTS

| | | | |
|---|---|---|---|
| DE | 3724361 | * | 2/1989 |
| DE | 4202721 | * | 8/1993 |
| JP | 11-41805 | * | 2/1999 |
| JP | 11108106 | | 4/1999 |
| WO | WO03/0729761 A1 | * | 9/2002 |

OTHER PUBLICATIONS

Translation of submitted JP 11–108106.*
Translation of JP11–41805.*
STIC provided translation of DE4202721.*

*Primary Examiner*—Douglas C. Butler
(74) *Attorney, Agent, or Firm*—Edward F. Murphy III (57) ABSTRACT

An apparatus comprising a frame; a member movable relative to said frame; a damping device interconnected between the frame and the movable member; a controller for activating the damper to generate a damping condition at a predetermined member operating condition; and system for activating the damping device at a predetermined operating condition of the moving member during a loss of power to the apparatus. The damping device may comprise a field controllable damper that includes a volume of field controllable fluid, which may in turn comprise magnetorheological fluid for example. The rheology of the field controllable fluid is effected during the application of the field.

3 Claims, 8 Drawing Sheets

U.S. PATENT DOCUMENTS

| | | |
|---|---|---|
| 5,325,677 A | 7/1994 | Payne et al. |
| 5,375,282 A | 12/1994 | Dausch et al. |
| 5,390,121 A | 2/1995 | Wolfe |
| 5,632,361 A * | 5/1997 | Wulff et al. .............. 188/267.1 |
| 5,744,876 A | 4/1998 | Fangio |
| 5,744,923 A | 4/1998 | Strauss et al. |
| 5,907,880 A | 6/1999 | Duranzzani et al. |
| 5,956,951 A | 9/1999 | O'Callaghan |
| 6,047,797 A | 4/2000 | Popjoy |
| 6,068,249 A | 5/2000 | Shtarkman |
| 6,070,681 A | 6/2000 | Catanzarite et al. |
| 6,082,715 A * | 7/2000 | Vandermolen ............... 267/131 |
| 6,100,655 A | 8/2000 | McIntosh |
| 6,123,312 A | 9/2000 | Dai |
| 6,151,930 A | 11/2000 | Carlson |
| 6,152,488 A | 11/2000 | Hedderly et al. |
| 6,419,057 B1 * | 7/2002 | Oliver et al. ............ 188/267.2 |
| 6,427,813 B1 | 8/2002 | Carlson |

* cited by examiner

SYSTEM AND METHOD FOR LIMITING VIBRATION IN AN APPARATUS DURING A LOSS OF POWER

FIELD OF THE INVENTION

The invention relates to an apparatus that includes a device for providing the required damping, resistance and motion control to the apparatus where the device is actuated by a signal, and more specifically the invention relates to a system and method for limiting vibration in an apparatus that employs a signal actuated damper during a loss of power to the apparatus.

BACKGROUND OF THE INVENTION

One class of well-known dampers and shock-absorbers uses a volume of hydraulic fluid as the working medium to create damping forces to control or minimize shock and/or vibration. Typically, the damping forces are generated by pressures resisting movement between operative components of the damper or shock absorber.

Another class of devices employed to minimize shock and/or vibration comprises devices that include a field controllable material such as a magnetorheological (MR) medium which may comprise MR fluid or MR powder. Such devices referred to as "MR devices" may be of the "rotary-acting" or "linear-acting" variety. Known MR devices include linear dampers, rotary brakes, and rotary clutches for example. Each MR device employs an MR medium comprised generally of soft-magnetic particles dispersed within a carrier. Typical particles include carbonyl iron, and the like, having various shapes, but which are preferably spherical and have mean diameters of between about 0.1 μm to about 500 μm. The carrier is most frequently a fluid among the group of fluids including low viscosity hydraulic oils, and the like. In operation, these MR fluids exhibit a thickening behavior (a rheology change) upon being exposed to a magnetic field. The higher the magnetic field strength in the fluid, the higher the damping/restraining force or torque that can be achieved within the MR device. The magnetic field is generated by supplying a current to a coil that is located proximate a pole piece.

Figure 1:
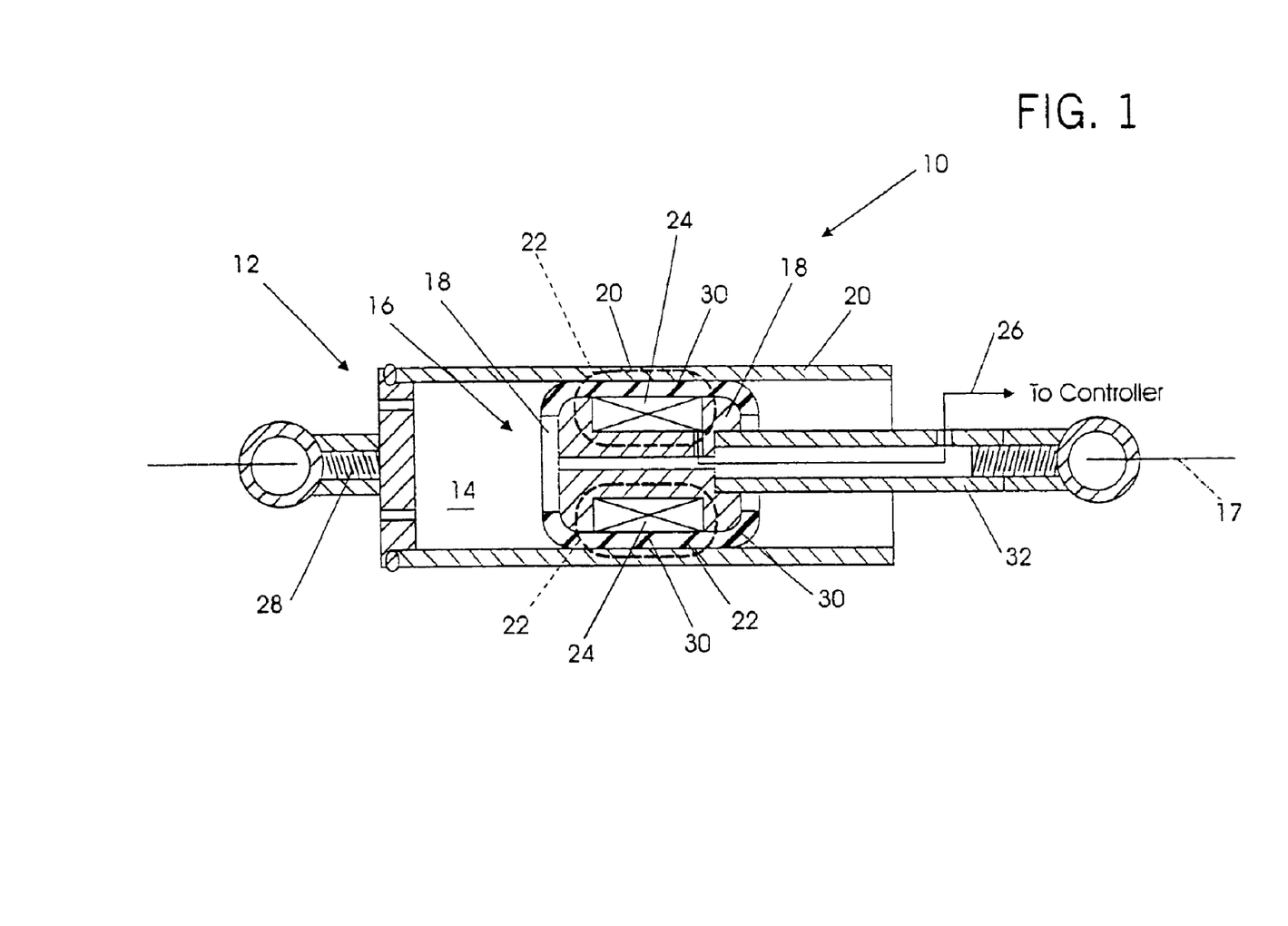
FIG. 1 is a longitudinal cross-section of a controllable linear damper.

FIG. 1 illustrates an exemplary MR damper of the type disclosed in U.S. Pat. Nos. 6,151,930 and 5,284,330 commonly assigned to the assignee of the present invention, Lord Corporation of Erie, Pa. the disclosures of which are incorporated herein by specific reference. Damper 10 may be used in a variety of applications. For example, a plurality of dampers may be used to support an engine on a vehicle frame or to suspend a drum in a washing machine cabinet or housing. The damper 10 of FIG. 1 includes cylindrical housing 12 that defines housing chamber 14 and piston member 16 disposed in the chamber and adapted to be translated linearly along axis 17 through the housing chamber. An attachment stem 28 is made integral with one end of the housing 12 in a conventional manner and the free end of the stem is in turn fixed to a frame such as the frame of a machine or engine by a conventional connection member such as a bolt for example.

The piston body 18 and the housing wall 20 are made of a magnetically permeable material such as a soft magnetic steel for example and the piston body and housing comprise pole pieces that define the path of magnetic field 22 represented in dashed font in FIG. 1. The piston body includes a piston rod 32 that is securely fixed to the piston, and the free end of the rod is in turn fixed in a conventional manner proximate the member, device or system that is the primary source of vibratory displacement such as an engine or an enclosure for a washing machine drum for example.

In the exemplary MR damper 10 of FIG. 1, a volume of a field controllable medium such as a magnetorheological medium is contained in an absorbent matrix 30 which is wrapped around the piston body 18. The absorbent matrix may include polyurethane foam for example. In an alternate embodiment, illustrated in incorporated by reference U.S. Pat. No. 5,284,330 the field controllable material is not retained in an absorbent matrix. A substantial portion of the housing chamber is filled with a volume of the field controllable material and during operation the field controllable material is displaced from one end of chamber 14 to the opposite end of chamber 14 as it is entrained in a gap between the piston body and housing wall during axial displacement of the piston through the housing chamber.

A magnetic field generating means 24 in the form of a coil is mounted on the piston body 18 to be movable with the piston as it is reciprocatingly displaced axially through the housing 14. The field generating means alters the rheology of the field responsive medium in proportion to the strength of the field. Wires 26 connect the coil comprising the field generating means to a controller, not shown in FIG. 1. The controller is disclosed schematically in FIGS. 3a–3e and the controller will be described in greater detail hereinafter.

During operation of damper 10 the field controllable medium becomes increasingly viscous with increasing field strength and provides a shear force to resist relative movement between housing and piston members 12 and 16. When the pole pieces are energized by magnetic field 22 the controllable fluid changes rheology in the matrix 30 located between the movable member 18 and the housing 12. In use, the circumferentially extending coil 24 generates a magnetic field 22 that acts on the pole pieces 18 and 20 and the field controllable medium contained by the matrix 30. The coil generates a magnetic field in response to the current supplied to the coil 24 by the controller. The resistive force produced by changing the field controllable medium's rheology can be varied by changing the magnetic field strength which in turn is controlled by the amount of current supplied to the field generating means 24 by the controller.

Figure 2:
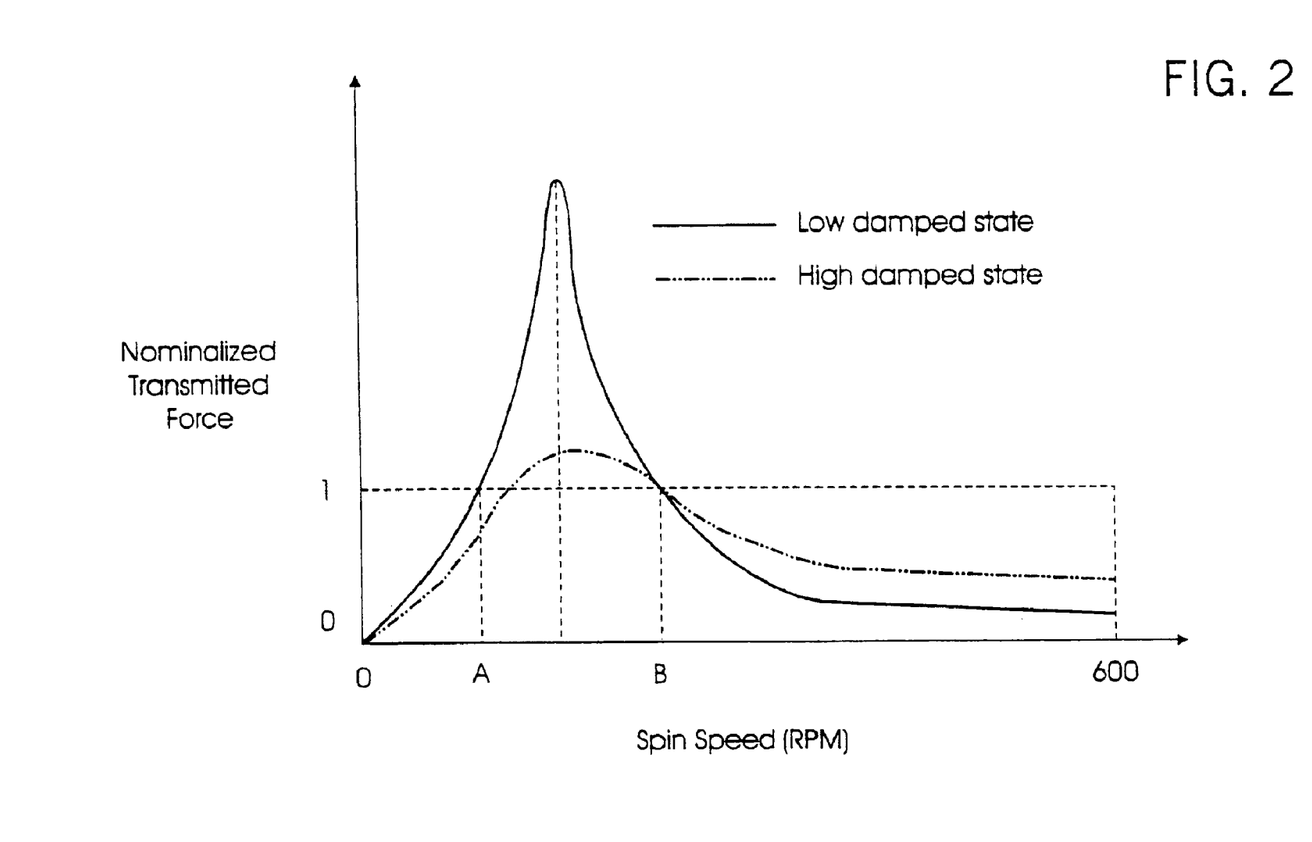
FIG. 2 is a graph of transmitted forces from a washing machine tub during a spin cycle.

When the damper is used to suspend washing machine drums from the washing machine cabinet, the magnitude of damping supplied is adjusted for the different washing cycles. Turning now to FIG. 2 which is a graph representing the transmitted washing machine forces during the range of washing machine drum spin speeds, the supplied damping is increased between points A and B on FIG. 2 which defines a the range of speeds that occur during machine resonance. For example, the washing machine represented by exemplary FIG. 2 experiences resonance as the drum passes through the speed range between minimum and maximum spin speed limit points A and B which may be 100 and 200 rpm for example. Resonance occurs during periods of machine drum acceleration and deceleration when the drum is spinning in the speed range between threshold points A and B. The supplied damping is reduced outside the spin speed range between points A and B.

The adjustable damping provided to washing machines by damper 10 is a considerable improvement over the single constant damping supplied by passive damping devices. If the damping was not supplied through resonance as the washing machine rotated through the speeds that produce a resonance condition, the produced vibratory forces could cause the washing machine to "walk" from its operating location. Also, the vibratory forces could damage the machine.

During a loss of power to the washing machine or other apparatus supported by one or more dampers 10, the required current is not supplied to the field generating means 24 to control damper 10. As a result, the requisite damping forces can not be supplied by damper 10 to control the vibration produced during resonance experienced as the washing machine rotates through the spin speeds between points A and B. Thus the washing machine passes through resonance undamped which could cause the washing machine to vibrate from its desired operating position and the machine could be damaged.

The foregoing illustrates limitations known to exist in present damping devices and methods. Thus, it is apparent that it would be advantageous to provide an alternative system and method whereby vibration is controlled in the event there is a loss of power to an apparatus. Accordingly, a suitable alternative is provided including features more fully disclosed hereinafter.

SUMMARY OF THE INVENTION

The present invention provides a method and system for controlling vibration in an apparatus in the event there is a loss of power to the apparatus. The invention relates to an apparatus that includes a device for providing the required damping, resistance and motion control to the apparatus where the device is actuated by a signal, and more specifically the invention relates to a system and method for limiting vibration in an apparatus that employs a signal actuated damper during a loss of power to the apparatus.

More specifically, the present invention comprises an apparatus, that further comprises a frame; a member movable relative to said frame; damping means including a volume of a field controllable medium, the field controllable damper being interconnected between the frame and the movable member; a controller for activating said field controllable damper to generate a damping condition at a predetermined member operating condition; and means for limiting vibration in said apparatus during a loss of power to the apparatus.

Although the means for limiting vibration is described as a field controllable damper, it should be understood that the device for limiting vibration may be any suitable damping device that is actuated by an electrical signal.

The means for limiting vibration may comprise the combination of a secondary controller and a storage device such as a battery or capacitor. Alternatively the secondary controller may be combined with a generator or a DC motor. The secondary controller may also be combined with a magnet attached to the damper and a coil where current is induced in the coil as the magnet is displaced by the damper. In each combination the battery, capacitor, generator, DC motor or magnet/coil produces the supplemental power required to activate the secondary controller and dampers as required as the apparatus spins down to thereby limit vibration in the apparatus.

Also, the means for limiting vibration may comprise a brake that is moved into engagement with the movable member when the power is lost by the apparatus. Such a brake may include a biasing member such as a spring for biasing a contact member toward the movable member and a solenoid for maintaining the contact member away from the movable member. During periods where power is being supplied to the apparatus the solenoid is activated by the controller to maintain the contact member away from the movable member. When power is lost, the solenoid is deactivated and the biasing member moves the contact member into braking engagement with the movable member.

The above-mentioned and further features, advantages, and characteristics of the present invention will become apparent from the accompanying descriptions of the preferred embodiments and attached drawings.

BRIEF DESCRIPTION OF THE DRAWINGS

The accompanying drawings which form a part of the specification, illustrate several key embodiments of the present invention. The drawings and description together, serve to fully explain the invention.

DETAILED DESCRIPTION OF THE PREFERRED EMBODIMENTS

Most generally, the present invention is a system and method for limiting vibration in an apparatus during a loss of power. The apparatus may include, but shall not be limited to a washing machine for example. The device for limiting vibration in such method and system may comprise any suitable vibration control device that is actuated by a signal. The vibration control device may further comprise a field controllable damper like damper 10 described hereinabove where vibration control is produced by supplying a signal to the device to effect the rheology of the volume of the field controllable medium housed in the damper. In order to describe a preferred embodiments of the present invention, as the description proceeds the system and method of the present invention will include the field controllable damper 10.

Figure 3A:
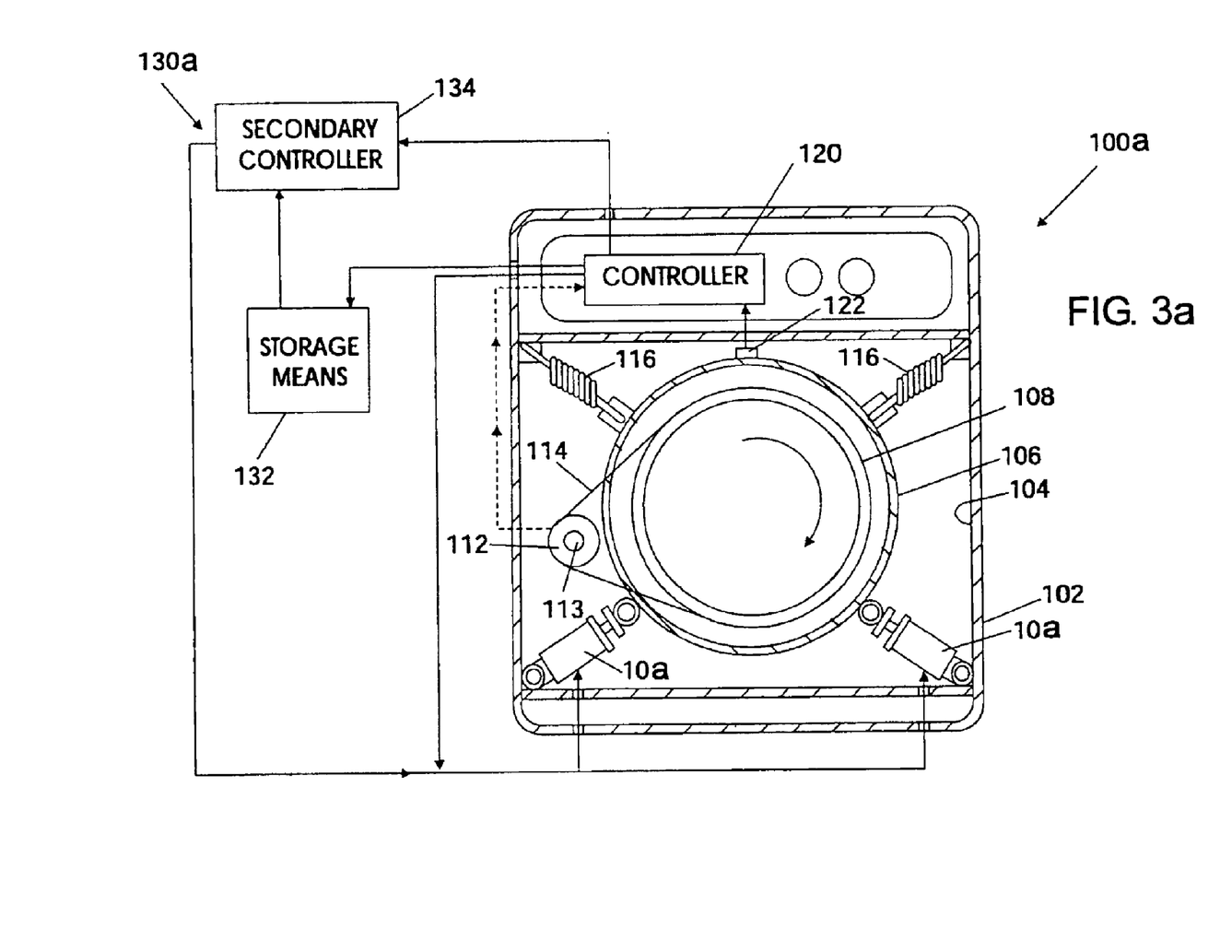
FIG. 3*a* is a front sectional view of a front loading washing machine including field controllable dampers and first embodiment means for limiting vibration during loss of power to the washing machine.
Figure 3B:
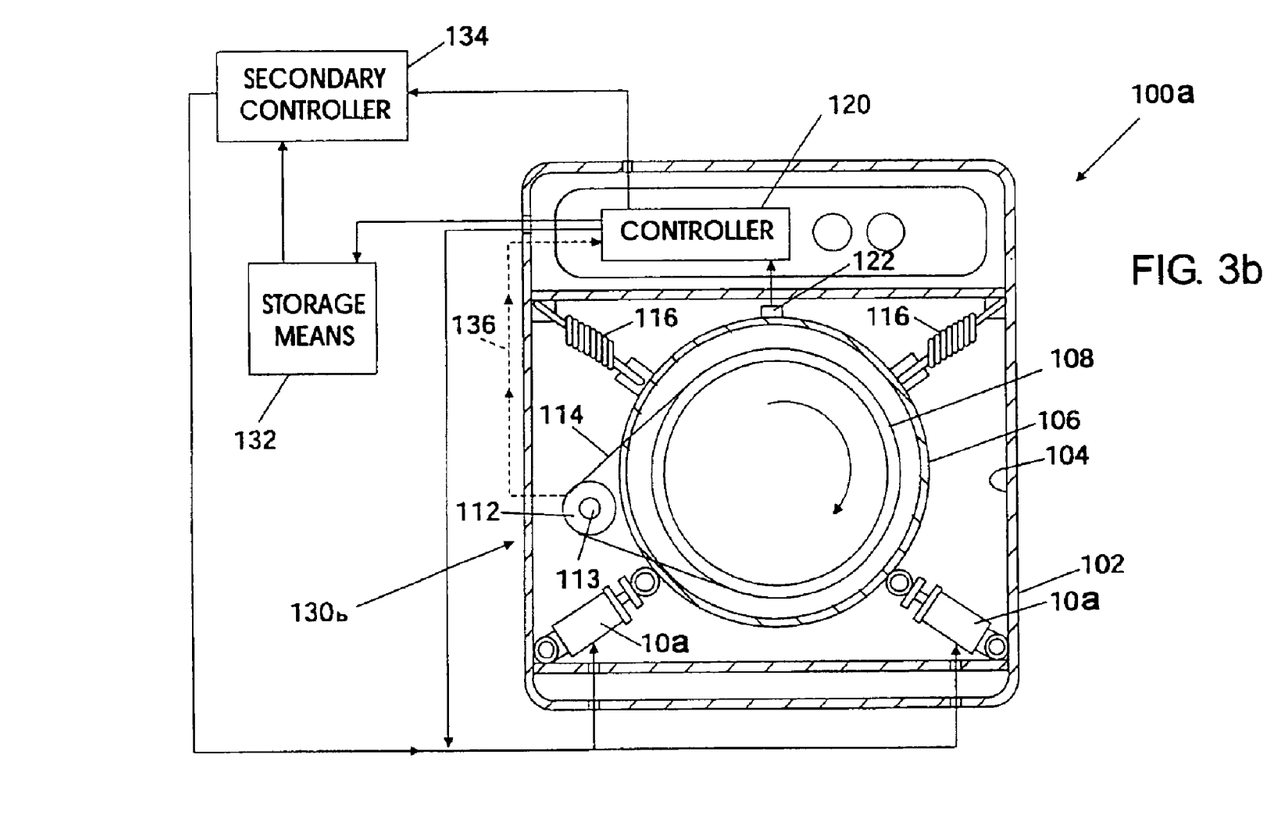
FIG. 3*b* is a front sectional view of a front loading washing machine including field controllable dampers and a second embodiment for limiting vibration during loss of power to the washing machine.
Figure 3C:
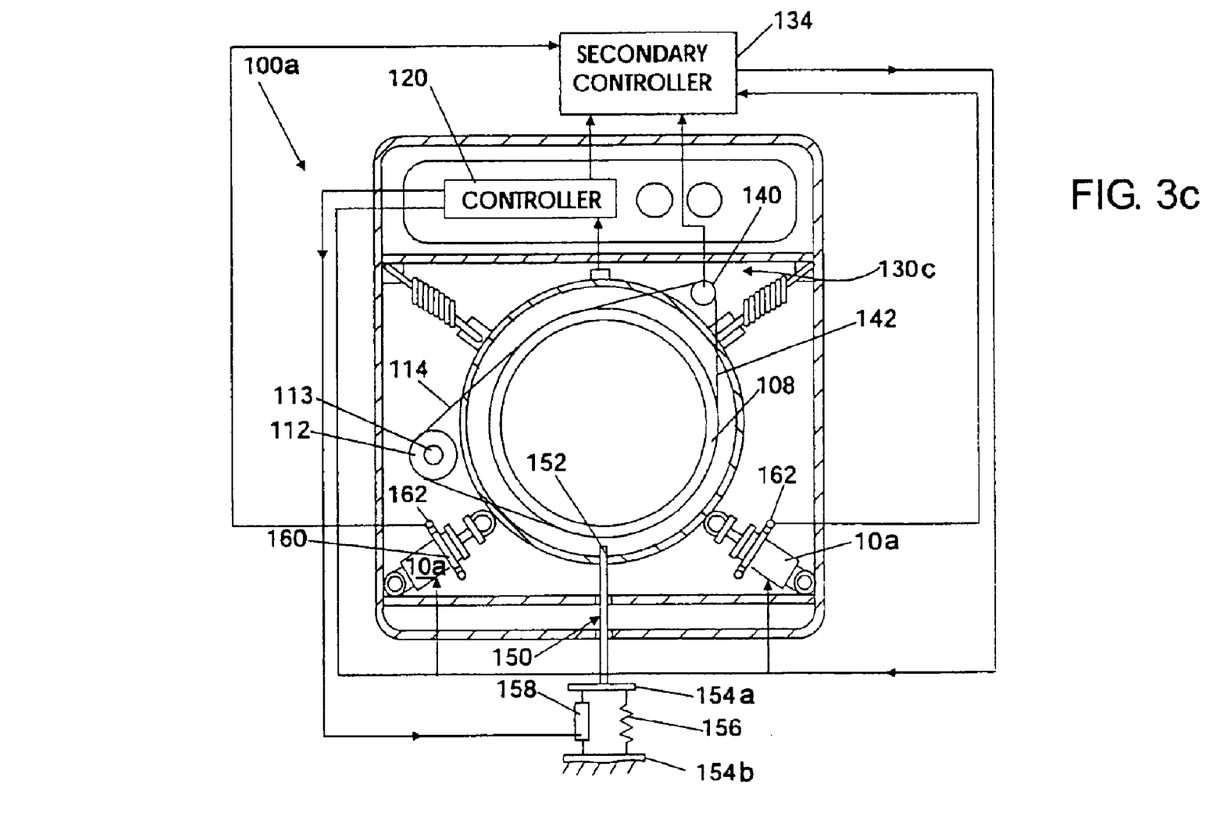
FIG. 3*c* is a front sectional view of a front loading washing machine including field controllable dampers and third embodiment means for limiting vibration during loss of power to the washing machine.
Figure 3D:
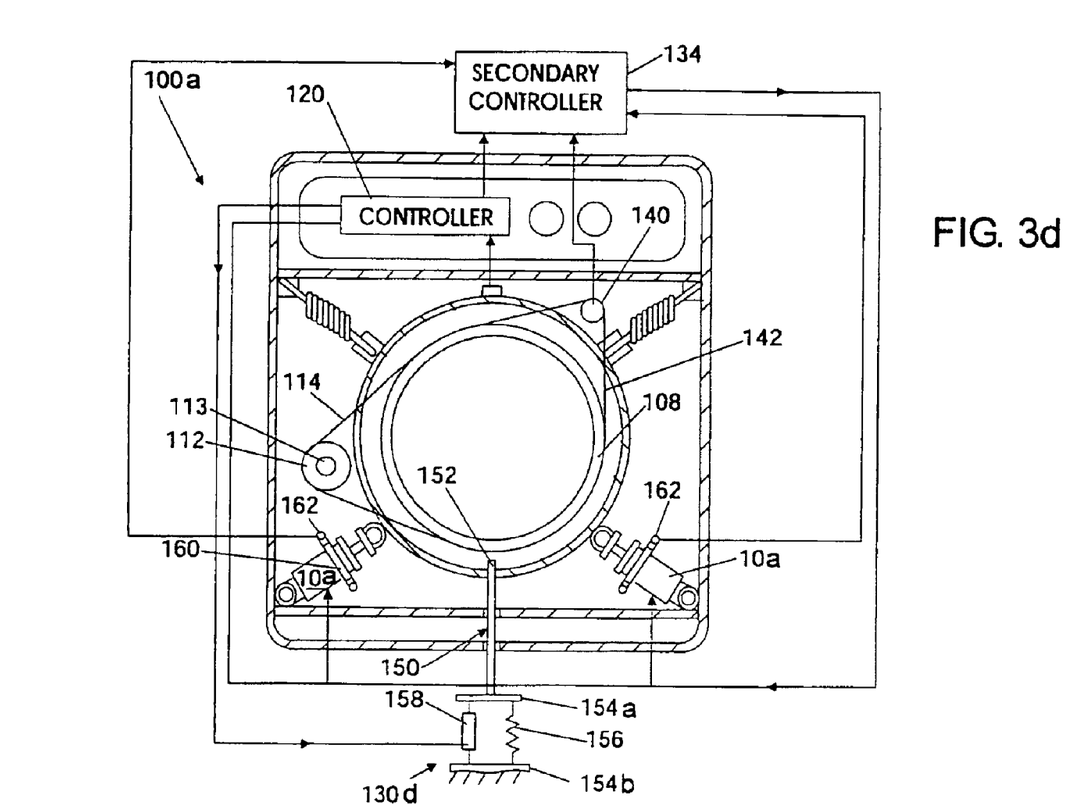
FIG. 3*d* is a front sectional view of a front loading washing machine including field controllable dampers and a fourth embodiment for limiting vibration during loss of power to the washing machine.
Figure 3E:
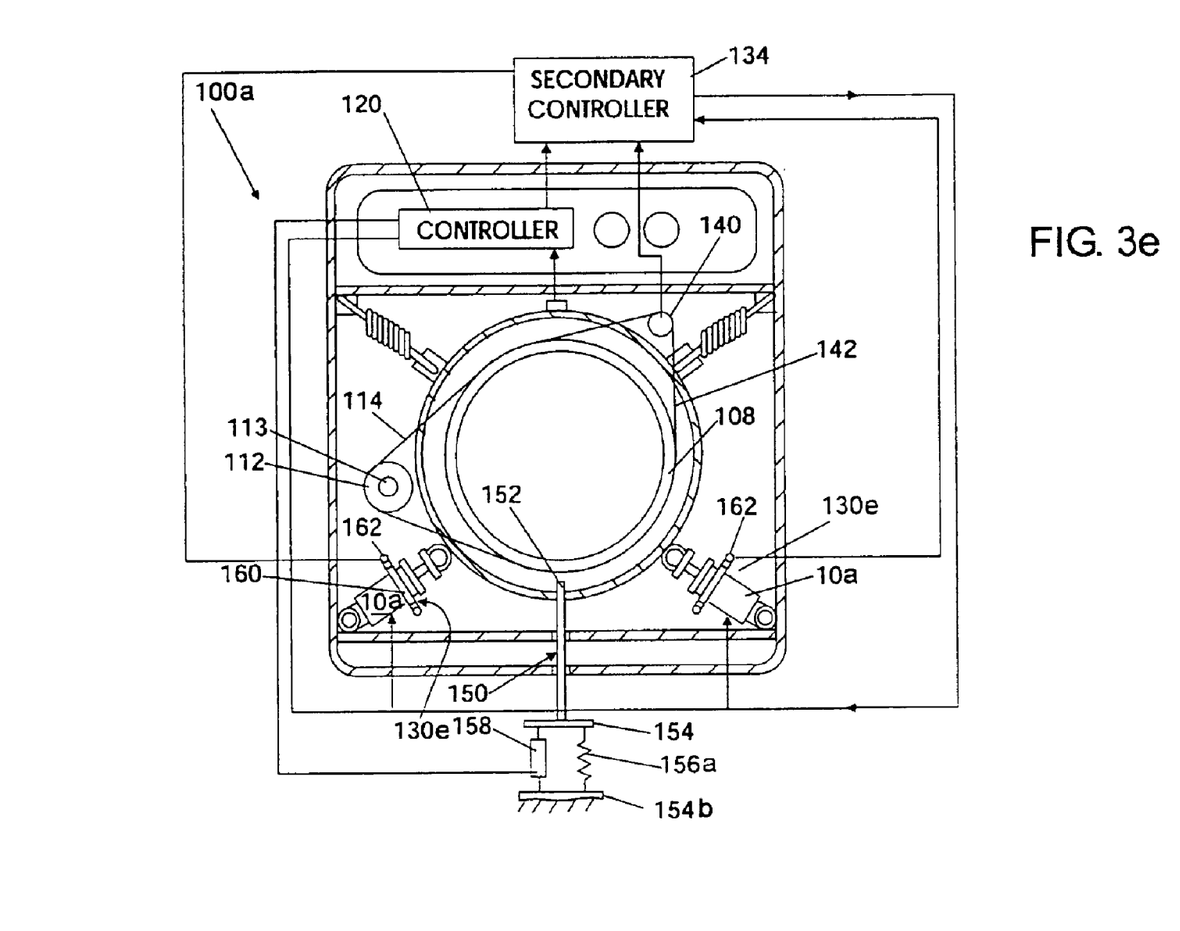
FIG. 3*e* is a front sectional view of a front loading washing machine including field controllable dampers and a fifth embodiment for limiting vibration during loss of power to the washing machine.

Referring to the drawing FIGS. 3*a*–3*e* that disclose the five preferred embodiments of the invention, it should be noted that the first and second embodiments respectively are illustrated schematically on FIG. 3*a* and FIG. 3*b* and the third, fourth and fifth embodiments of the invention respectively are illustrated on FIG. 3*c*, FIG. 3*d*, and FIG. 3*e*.

Figure 4:
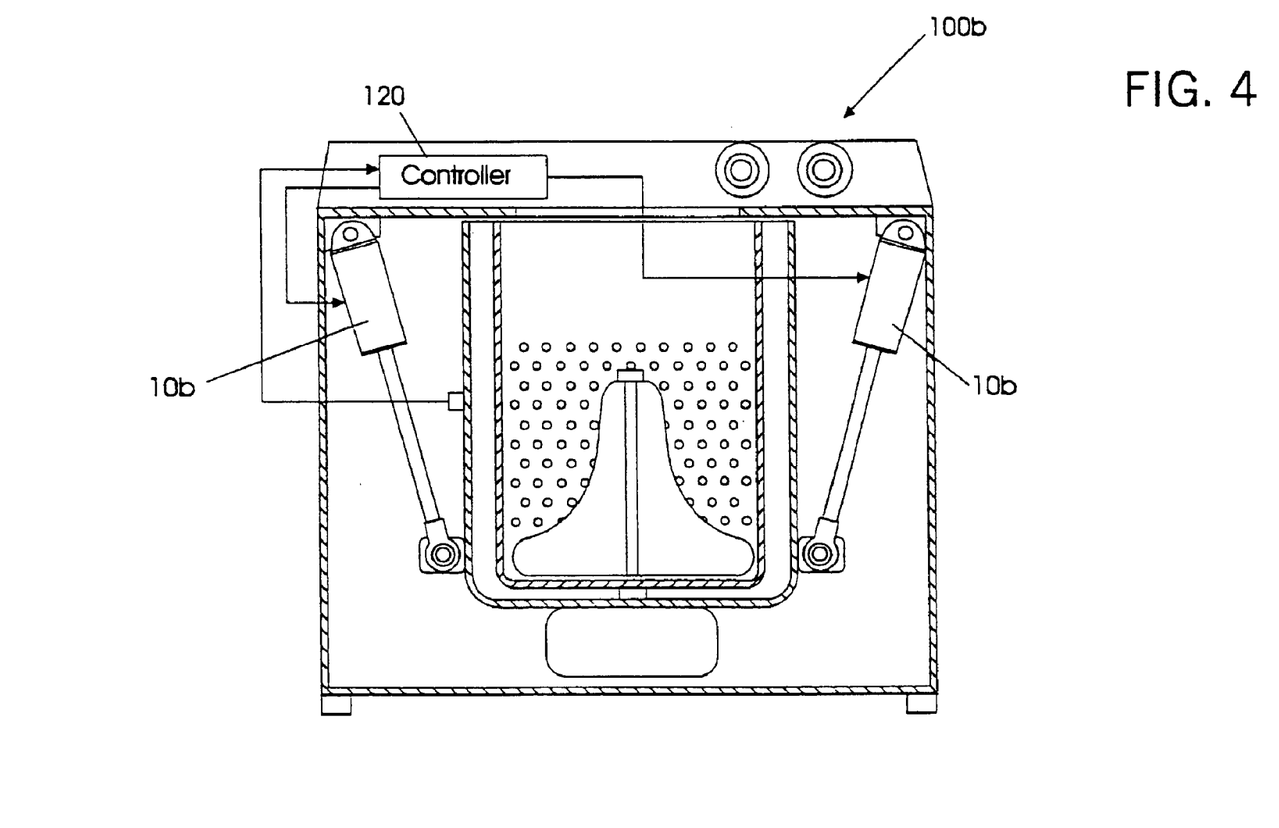
FIG. 4 is a side sectional view of a top loading washing machine including field controllable dampers with integrated springs.

Now referring to the drawings wherein like numerals denote like items, FIG. 3*a* is a front sectional view of apparatus 100*a* that comprises the system 102 of the present invention for controlling the dampers 10a of apparatus 100a in the event electrical power supply to apparatus 100a is lost. The first embodiment for limiting vibration when power is lost is identified in FIG. 3a as 130a. The second embodiment for limiting vibration when power is lost is identified in FIG. 3b as 130b. For purposes of describing the preferred embodiments of the invention, the apparatus 100a is a front loading clothes washing machine. However it should be understood that the apparatus may be any electrically powered apparatus with damping that is controlled by one or more field controllable dampers. More specifically, in addition to the front loading clothes washing machine 100a the apparatus may include top loading washing machine 100b shown in sectional schematic view of FIG. 4 or a centrifuge (not shown). The systems and methods for controlling vibration operate the same on different apparatus so that as the description proceeds the structure and functionality of the five alternate embodiment systems will be described in use with the front loading machine 100a.

Returning now to the clothes washing machine illustrated in FIGS. 3a–3e, the washing machine 100a comprises a housing 102 that defines a chamber 104 with controllable dampers 10a, such as those described in reference to FIG. 1, mounted in the apparatus 100a as components of the suspension and damping system. The field controllable dampers associated with top loading machine 100b are identified in FIG. 4 as 10b. The front loading machine 100a has a horizontally-mounted drum 106 including a rotational portion 108 rotationally fixed and derivable relative to drum 106 by a conventional motor 112 and belt 114 system. The motor may be any conventional motor such as any AC or DC type electric motor. The motor is supported in a conventional manner by the housing 102 using the required brackets or other suitable connection members (not shown). The drum 106 (and rotational portion 108) are flexibly suspended relative to a housing or cabinet 102 by flexible springs 116, such as coil springs for example. Dampers 10a, of the type previously described hereinabove provide control of radial vibrations of the drum 106.

The dampers 10 are connected to master controller 120 in signal receiving relation to the controller. The controller 120, which may be any suitable microprocessor based controller, is in signal receiving relation with sensor 122 which may be a speed sensor for monitoring the rotational velocity of drum 108 or an accelerometer that monitors drum vibration. The sensor is fixedly mounted on the housing drum 106, but may be fixed in any suitable location. For example, alternatively, the accelerometer may be fixed to the housing 102 to measure the housing vibration.

During use, when power is supplied continuously to the washing machine 100a, and the drum 108 is spinning with a rotational velocity or drum spin speed that is within a range of speeds predetermined to coincide with a resonance condition in the drum, (for example the range between points A and B in FIG. 2) a damper activating signal, in the form of a current is sent from the master controller 120 to the dampers 10a in the manner represented schematically in FIG. 3a. The resonance condition typically occurs during the machine spin cycle. The current signal sent by controller 120 to the dampers changes the rheology of the field controllable material. As the viscosity of the material is increased the dampers 10a provide the damping required to absorb the vibratory loads present during the resonance condition. At predetermined intervals, the sensor 122 delivers signals indicating the measured rotational velocity of the drum 108 to the master controller 120 and the controller logic determines when the speed of the drum is outside the resonance spin speed limits. When the speed is outside of the spin speed range defined between points A and B, the controller stops sending the current signal to the dampers and the damping provided by dampers 10a is reduced.

The apparatus 100a also includes a first embodiment means for limiting vibration in the apparatus 100a in the event that there is a loss of power to the apparatus, and such first embodiment means is designated generally at 130a in FIG. 3a. When power is lost by the apparatus, the controller 120 also loses power and cannot transmit signals to dampers 10a as required. The first embodiment means 130a is comprised of a storage means such as a battery or other storage cell 132 and a secondary controller 134. The secondary controller controls the damping supplied by field controllable dampers 10a during a loss of power to the apparatus 100a and the secondary controller may comprise any suitable microprocessor based controller. As shown in FIG. 3a, the secondary controller is electrically connected to the storage means in signal receiving relation therewith. The secondary controller 134 is also in signal receiving relation with main controller 120 and is in signal transmitting relation with dampers 10a of apparatus 100a.

In use, the main controller 120 transmits a voltage signal to the secondary controller at predetermined intervals to indicate that power is being supplied to the apparatus. The signal may be a 5V or 12V signal for example. If during at least one interval the signal is not transmitted to the secondary controller, the secondary controller logic determines that the main power supply to the apparatus has been lost. The secondary controller 134 immediately begins to draw power from the battery 132 to power up controller 134. Signals are sent from sensor 122 through the controller 120 to the secondary controller. After power is lost by apparatus 100a the rotational speed of the drum naturally starts to decrease. Assuming the rotational speed of the drum is above upper limit B of FIG. 2 when the power is lost, when the sensed rotational velocity of the drum reaches the predetermined upper resonance limit, B, in FIG. 2 a current signal is sent from secondary controller 134 to dampers 10a to provide the damping required to offset the vibratory forces generated during the resonance condition. In this way, if power is lost, the apparatus 100a will not be damaged and will not "walk" from it desired operating location.

Once the speed of the drum is sensed to be below the spin speed represented by point A in FIG. 2, the secondary controller stops sending current signals to dampers 10a. Soon thereafter, the drum 108 comes to a stop. If the drum is rotating at a speed that is below resonance lower speed limit A when the power is lost, the battery will continue to supply power to the secondary controller 134 and no signal will be sent to dampers 10. The battery may have enough storage capacity to power the system 130a for a period of about 5–10 seconds which is about the period required to rotate the drum down to a stop from any operating spin speed.

If the motor 112 is a conventional direct current (DC) type motor, the kinetic energy of the drum 108 is converted to electrical energy by the DC motor and the electrical energy is available at the terminals of the DC motor. In an alternate embodiment of the invention identified at 130b in FIG. 3b, during normal use of apparatus 100a the storage means 132 may receive a charge from the motor 112. The storage means may be a battery or conventional capacitor plate. Alternatively, the storage means may be a bank of batteries or capacitor plates. The motor is electrically connected to the main controller in signal transmitting relation with the controller. The electrical connection is represented in dashed font connection 136. In the alternate embodiment means for controlling vibration during loss of power 130b, the capacitor (or battery) is continuously charged during operation of apparatus 100a. The storage device 132 receives the charging signal from the main controller as represented schematically in FIG. 3b.

When power is lost by the apparatus 100a, the secondary controller 134 immediately begins to draw power from the storage device 132. The capacitive energy is released to the controller 134 and dampers 10a as required in the manner previously described in conjunction with first embodiment means 130a until the drum comes to a stop.

Third, fourth and fifth embodiment means for activating dampers 10 and fail safe controller 134 during a loss of power to apparatus 100a are illustrated in FIG. 3c, 3d, and 3e and are identified generally as 130c, 130d and 130e respectively. In third embodiment means 130c, a conventional generator 140 is located proximate spinning drum 108 and is connected to the drum by a conventional belt 142 and in this way, the kinetic energy of the drum is converted to electrical energy by the generator as the drum rotates.

Although the electrical generator means 140 is illustrated in FIG. 3c as being located away from motor 112 and driven by separate drive belt 142, it should be understood that the generator may be mechanically connected to the rotating shaft 113 of motor 112 or to the motor drive belt 114.

In use, when the apparatus 100a loses power, as the drum 108 spins down, the generator continues to produce electrical power that is supplied directly to the secondary controller 134. If during the spin down the drum speed falls within the spin speed range between points A and B of FIG. 2 the secondary controller supplies current signals to dampers 10a. The generator continues to produce electrical energy until the drum 108 stops rotating.

A fourth embodiment means for limiting vibration during a power loss is identified at 130d in FIG. 3d. The fourth embodiment means comprises an electromechanical brake. Shown schematically in FIG. 3d, the brake comprises a contact member 150 with a contact end 152 located proximate the movable drum 108. The brake comprises a pair of spaced rigid plates 154a, 154b. Plate 154b is fixed and plate 154a is movable linearly relative to plate 154b. The ends of a conventional spring member 156 such as a coil spring are connected to the plates and the spring member serves to bias the plates apart. Solenoid member 158 has ends that are connected to the plates 154a and 154b and the solenoid serves to overcome the outward bias of spring member 156. During the supply of power to apparatus 100a an activating signal, in the form of a voltage, is sent to solenoid 158 from controller 120 and serves to maintain the solenoid retracted. When the solenoid is retracted the braking end 152 of contact member 150 is out of contact with the drum.

When power is lost, the solenoid activating signal is terminated, and as a result, the spring extends causing plate 154a to move linearly away from plate 154b and thereby causing braking member end 152 to be moved into braking contact with the rotating drum. The contact between member 150 and drum 108 causes the drum to decelerate to a stop quickly. Brake 130d of the fourth embodiment means of the present invention is illustrated schematically for purposes of describing a fourth preferred embodiment of the invention however it should be understood that the brake may assume a variety of configurations. In summary the brake comprises a braking member and a means for maintaining the member away from the rotating drum when power is supplied and for causing the member to be moved into engagement with the drum when power to the apparatus is lost.

The fifth embodiment means for limiting vibration during a power loss is identified as 130e in FIG. 3e. The fifth embodiment system utilizes damper motion to induce electric current in a coil located proximate the damper. A conventional permanent magnet 160 is fixed to the exterior of the housing of dampers 10a to be movable therewith. The coil of conductive wire 162 is located proximate each magnet member and is stationary. As the damper is displaced linearly the damper induces electric current in the coil in a conventional manner well known to one skilled in the art. As shown in FIG. 3e, each coil is located in signal transmitting relation to the secondary controller 134.

When the power is supplied to apparatus 100a, the current is induced in coil 162 as the dampers 10 are displaced linearly to offset vibration of drum 108. When the power is lost, the electric current is released to drive the secondary controller. The dampers 10a are activated as required by current signals from the controller 134.

While several embodiments including the preferred embodiment of the present invention have been described in detail, various modifications, alterations, changes, and adaptations to the aforementioned may be made without departing from the spirit and scope of the present invention defined in the appended claims. It is intended that all such modifications, alterations, and changes be considered part of the present invention.

What is claimed is:

1. A washing machine comprising: a frame; a washing machine drum movable relative to said frame, a washing machine motor, said washing machine motor distal from said washing machine drum, said washing machine motor moving said washing machine drum with a belt system; a damper including a field controllable medium, the damper interconnected between the frame and the movable washing machine drum; a controller for activating said damper to generate a damping condition at a predetermined member operating condition; and a brake for limiting vibration in said apparatus during a loss of power to the apparatus, said brake distal from said washing machine motor, said brake comprised of first and second spaced apart members, the second member being movable relative to the first member; a contact member made integral with the second member, said contact member having a contact end proximate the movable washing machine drum; biasing means for increasing the distance between the members; and means for limiting the relative displacement between said members, said means for limiting the relative member displacement being activated when power is supplied to the washing machine and being deactivated when the power to the washing machine is lost, wherein said brake contact member contacts said washing machine drum distal from said washing machine motor.

2. The washing machine as claimed in claim 1 wherein the biasing means is a spring.

3. The washing machine as claimed in claim 1 wherein the means for limiting the relative displacement of the first and second spaced apart members is a solenoid, said solenoid being in signal receiving relation with said controller.

* * * * *